United States Patent
Whittaker

[11] Patent Number: 5,832,250
[45] Date of Patent: Nov. 3, 1998

[54] MULTI SET CACHE STRUCTURE HAVING PARITY RAMS HOLDING PARITY BITS FOR TAG DATA AND FOR STATUS DATA UTILIZING PREDICTION CIRCUITRY THAT PREDICTS AND GENERATES THE NEEDED PARITY BITS

[75] Inventor: Bruce Ernest Whittaker, Mission Viejo, Calif.

[73] Assignee: Unisys Corporation, Blue Bell, Pa.

[21] Appl. No.: 592,089

[22] Filed: Jan. 26, 1996

[51] Int. Cl.[6] ................................................ G06F 13/00
[52] U.S. Cl. ...................... 395/471; 395/445; 395/449; 371/49.2; 371/49.4; 364/DIG. 1
[58] Field of Search ...................... 395/445, 449, 395/468, 471; 371/49.2, 49.4

[56] References Cited

U.S. PATENT DOCUMENTS

| | | | |
|---|---|---|---|
| 5,191,243 | 3/1993 | Shen et al. ............................... | 307/465 |
| 5,345,582 | 9/1994 | Tsuchiya .................................. | 395/575 |
| 5,369,753 | 11/1994 | Tipley ..................................... | 395/449 |
| 5,450,565 | 9/1995 | Nadir et al. .............................. | 395/427 |
| 5,479,641 | 12/1995 | Nadir et al. .............................. | 395/455 |
| 5,530,832 | 6/1996 | So et al. .................................. | 395/449 |
| 5,553,266 | 9/1996 | Metzger et al. ......................... | 395/471 |
| 5,557,622 | 9/1996 | Hassoun et al. ........................ | 371/49.1 |

*Primary Examiner*—Frank J. Asta
*Attorney, Agent, or Firm*—Alfred W. Kozak; Mark T. Starr; Steven R. Petersen

[57] ABSTRACT

A multi-set cache structure, providing a first-level cache and second level cache to a processor, stores data words where each word holds two bytes and two status bits. Each cache set includes a Tag RAM for holding the address data words and a Parity RAM holding a parity bit for each byte and a parity bit for the two status bits. A programmable array logic control unit has a predictive generator logic unit to generate the proper "status parity bit" for each set of status bits (V,R) without need for waiting to calculate the status parity bit from the existing values of the two status bits.

7 Claims, 6 Drawing Sheets

MULTI SET CACHE STRUCTURE HAVING PARITY RAMS HOLDING PARITY BITS FOR TAG DATA AND FOR STATUS DATA UTILIZING PREDICTION CIRCUITRY THAT PREDICTS AND GENERATES THE NEEDED PARITY BITS

CROSS REFERENCE TO RELATED APPLICATIONS

This application is related to two co-pending applications, the first of which is U.S. Ser. No. 592,092 filed Jan. 26,1996 and entitled "Smart Fill Logic Allowing Full Efficiency of Multi-Way Cache System". This application is also related to another pending patent application, U.S. Ser. No. 592,093 filed Jan. 26,1996 and entitled "Processor Bus Traffic Optimization System for Multi-Level Cache Utilizing Reflection Status Bit."

FIELD OF THE INVENTION

The present dislosure provides a simplified method of deriving status bits and their associated parity bits from the context of a given situation by means of predictive circuitry, rather than by the need to calculate status and parity.

BACKGROUND OF THE INVENTION

Figure 3A:
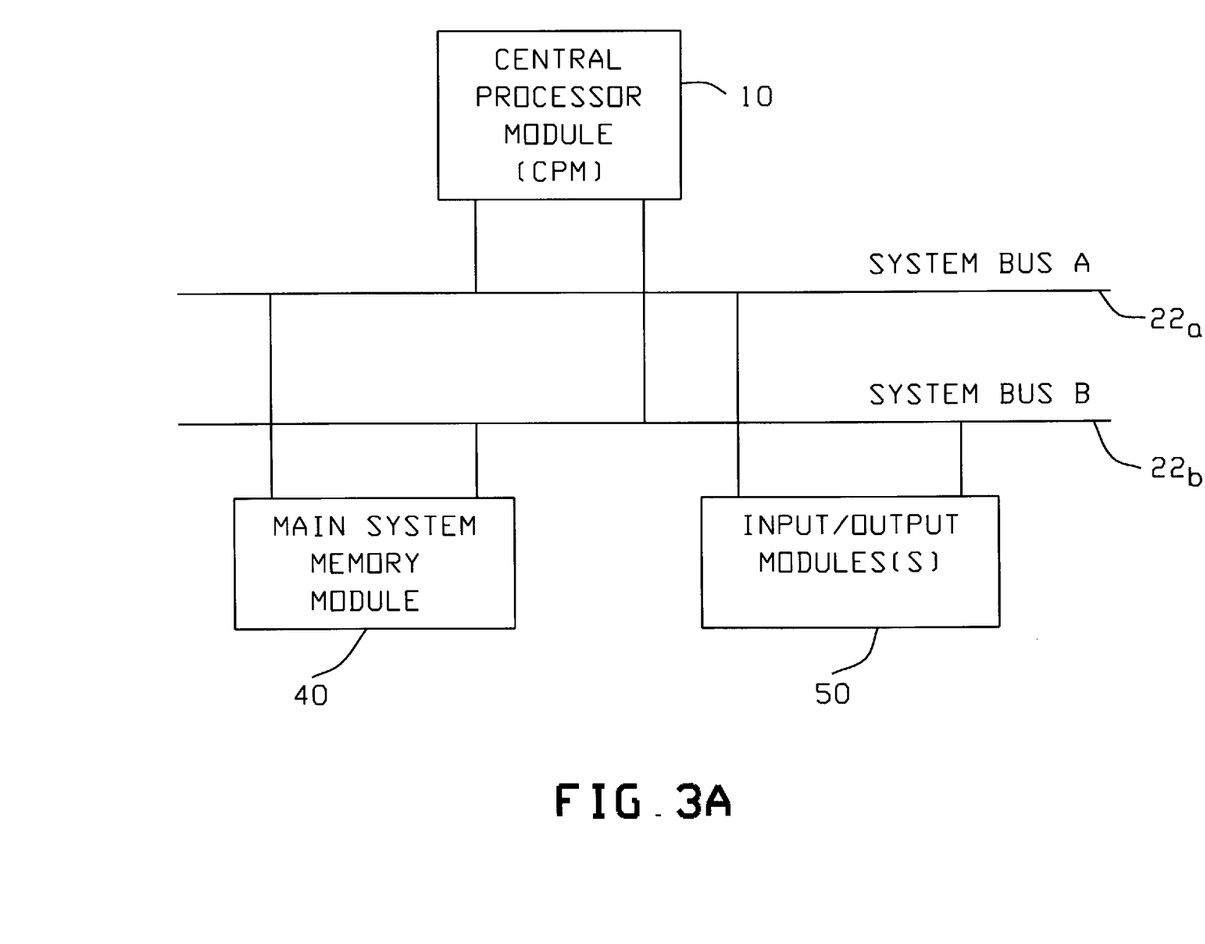
FIG. 3A is a general drawing of a computer network connected by dual system busses involving a Central Processing Module, Main Memory and Input/Output modules.

As seen in FIG. 3A, there is indicated a simplified diagram of a digital computing system which involves a network including a Central Processing Module 10 (CPM), an Input/Output module 50, and a Main System Memory Module 40 all connected by dual redundant system busses 22a and 22b.

Figure 3B:
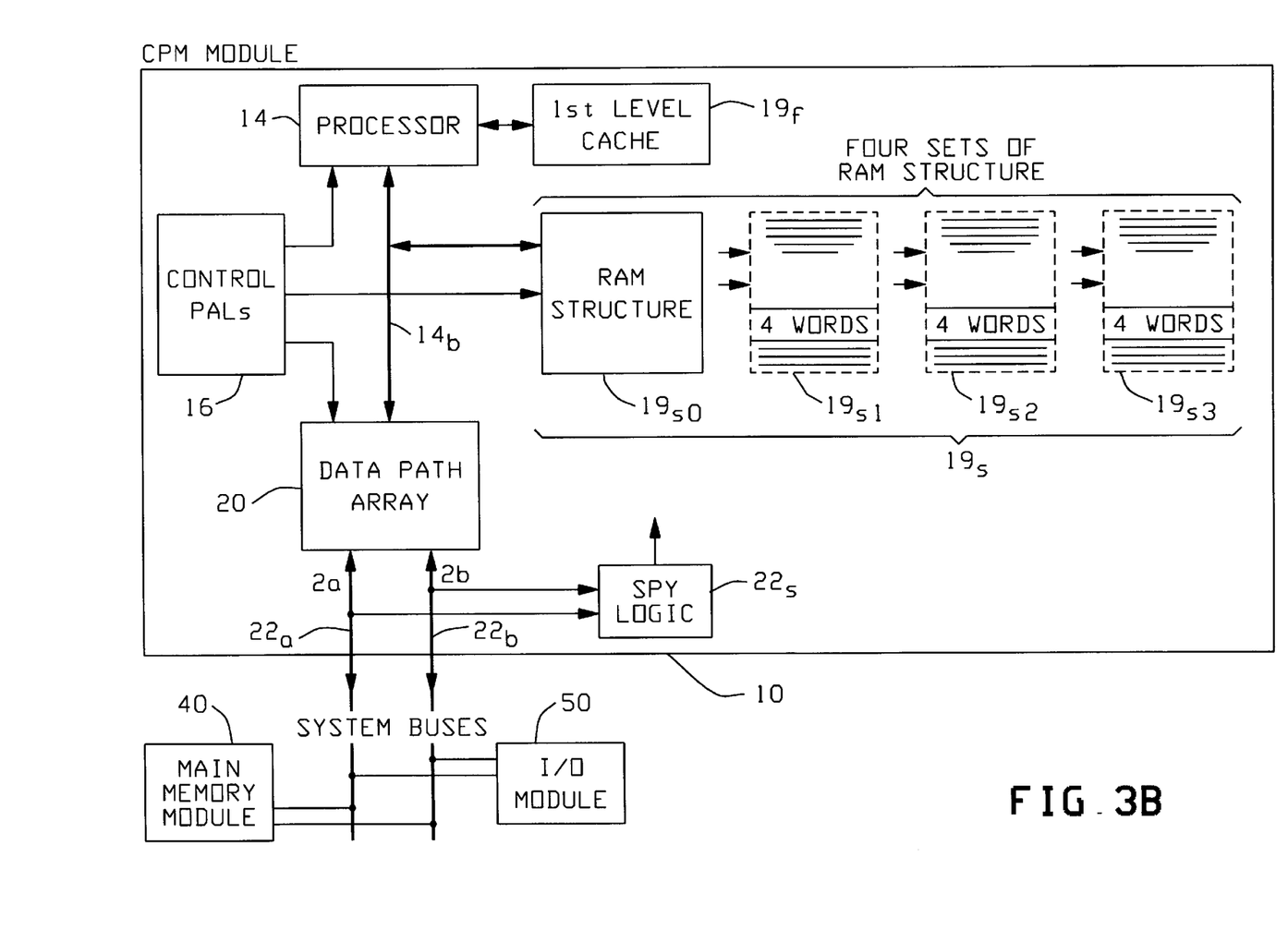
FIG. 3B is a more detailed drawing of the elements in the Central Processing Module.

The Central Processing Module 10 of FIG. 3A is shown in FIG. 3B in greater detail to indicate the major elements of the Central Processing Module 10. The Central Processor 14 has a local first level cache 19f and also has a processor bus 14b which connects to a RAM structure 19s which is a second level cache and in this particular example, may be made of four sets of RAM structure which constitutes the entire second level cache. The data path array 20 provides the paths from the processor bus 14b to the system busses 22a, 22b, which carry data to and from the main memory module 40 and the I/O module 50. Control signals are provided by the programmable array logic designated Control PAL 16, which are programmable, flexible, soft devices to provide various control logic signals for the Central Processing Module 10. A spy logic unit 22s can be used to sense the addresses of data which are being modified so that coherency can be maintained in the cache structure 19s.

The focus of the present invention involves the second level cache structure 19s shown as four shaded blocks of RAM structure. It is possible in one example, that the RAM structure 19s might be a "register file" structure for providing fast, temporary holding registers for the processor 14. Or, as is the case example discussed herein, the RAM structure 19s is indicated as a second level local cache memory on the processor bus 14b.

Often, with such a RAM structure, there will be stored some particular types of data values together with several bits of "status" information. These "status bits" may indicate some special information about the data values stored in each particular RAM location. One status bit type of information that is frequently used is a "valid" indicator bit "V". Here, this status bit indicates whether the remainder of the data values stored at that particular location are currently valid or not. Such a status bit allows the logic that monitors the RAM structure to only investigate a single bit, the status bit, in order to ascertain whether the remainder of the data word at that location should be available for use for some action. Additional status bits might also be used which convey unique insights regarding the current data value at that location in question. Cache memory structures will use status bits along with each "Tag" address value to indicate whether the address stored at that location has "valid" data associated with it or not.

Whatever may be the specific type and purpose of a RAM structure in the CPM, it is known that RAM devices are often a weak link in the reliability of a digital system design. For this reason, data integrity methodologies are often used to help ensure data integrity in the RAM structures and to detect bad data in the RAMs when they are read-out by the processor or some other module.

The "parity method" is such a integrity methodology. Parity provides the storing of several "extra bit" values along with the data values stored at a particular location in the RAM device. These "parity bits" along with the actual stored data values, can be used to verify data integrity of that particular word data at the time that the word data is read-out from the RAM, that is to say, that, that data which was actually written into the RAM is now what is to be read-out from the RAM at that particular address location.

Two types of basic parity methodology are well-known in the industry, namely, the use of "odd" parity and the use of "even" parity. Either methodology might be used, however, in the design discussed herein, it will be seen that "odd" parity was chosen such that the number of "1" bits in the stored data value, plus the parity bit, must then add up to an "odd" number. If this is not the case for any addressed word location, then a parity error is detected to indicate that the data read-out is not reliable.

When the parity method is used, there must be some means of generating and checking the "odd" parity value and this must be added into the RAM structure itself. There are standard off-the-shelf devices which are available for simple parity structures which will generate and check parity integrity. One of such devices is a logic chip manufactured by Texas Instruments Company of Dallas, Tex., and designated as 74F280. However, the use of such standard devices may not always be the easiest way or best method for generation and checking of the required parity values.

Figure 2A:
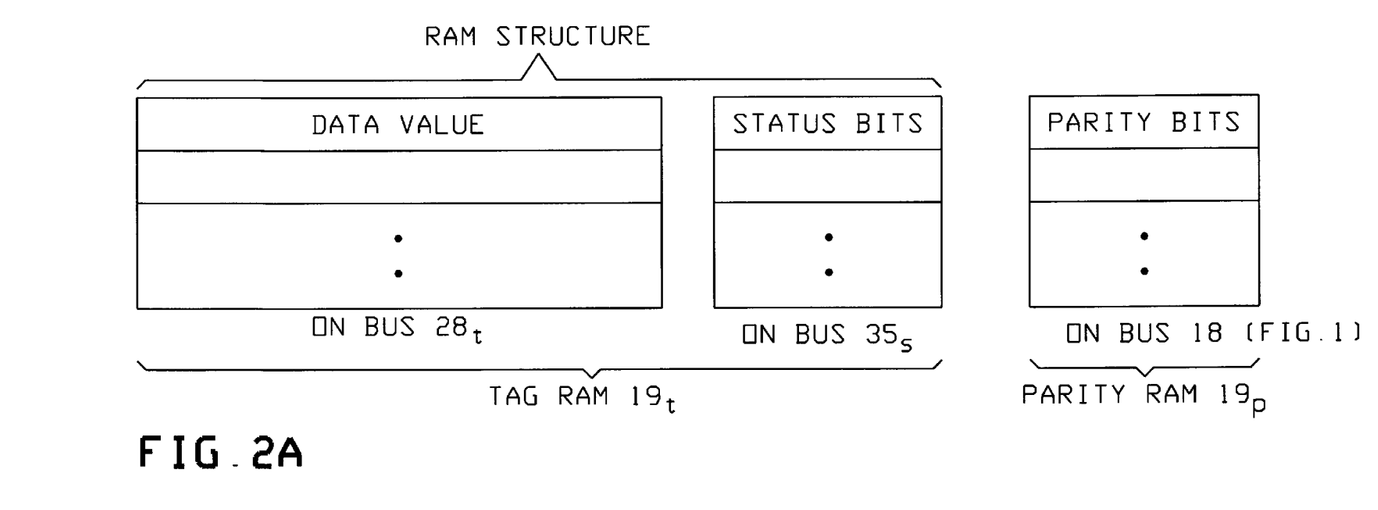
FIG. 2A is a schematic drawing of a word in the RAM structure which has a data value portion, a status bits portion, and a parity bits portion.

FIG. 2A is a sketch to indicate and show a generalized view of a typical RAM structure having stored words. Thus, each stored word at a given locational address can be seen to include the actual data value (a Tag address if a cache Tag structure is used), the status bits portion and the associated parity bits for both the data value portion and the status bits portion. Each address location in the RAM structure 19s (FIG. 3B) will have all of these elements.

Each time that information is to be written into a location in the RAM structure 19s(FIG. 3B), the appropriate data value is sourced into the RAM structure as input data. Such data may come from several sources, such as a processor 14 or from other modules. However, the necessary associated "status bits" must be generated and this is a significant part of the presently described system. Also, along with the data values and the status bits, there must be generated the proper parity bits for both the data value and also for the status bits. The generation of parity for the status bits is also a significant function of the system described herein.

Each time that the RAM structure 19s (FIG. 3B) is "read", the parity for the data value and the parity for the status bits must be checked in order to assure that no data or status information has been lost while it has been stored in the RAM structure 19s. The check-out or "checking" of the parity for the status bits is also a significant function of the presently disclosed system. In the type of system presently shown herein, there are several factors which make the use of standard parity devices ineffective. In this case, and in many other perceivable applications, for the few status bits involved, the 8-bit standard-type parity devices are actually an overkill and inefficient usage of circuitry.

The generation and the checking of the status bit values and their parity values is accomplished very simply and inexpensively in the present system, as part of a flexible, programmable, Control PAL device 16 which is often called a "Flex PAL" such as produced by the Intel Corporation of Santa Clara, Calif., or the Altera Corporation, of Santa Clara, Calif. Such a programmable Control PAL device 16 is opposed to the inflexible, fixed standard parity type of generation devices. The presently described method comes virtually free of extra circuitry and allows a greater amount of flexibility since the device is field programmable.

The objectives of the present system thus include more efficient means for generating the associated status bits for each data word and also the generation of the proper parity bits for both the data value and for the status bits.

SUMMARY OF THE INVENTION

A computer network uses a central processor serviced by a small first level cache and a large second level cache. Each cache is made of multiple sets of cache units and each addressed location holds four words. Each cache set of the multiple sets of the cache structure has its own Tag RAM and Parity RAM. Each individual word in the Tag RAM has two 8-bit bytes and two "status" bits V, R, plus 4 associated parity bits P1, P2, Px, Ps in the Parity RAM.

The V bit status indicates validity (V=1) of the 2 bytes in the Tag RAM. The R bit status tells the second level cache that when R=1, the first level cache has a valid copy of corresponding data in the Tag RAM (second level cache).

The generation of the parity bits PI, P2, Px, Ps, for placement in each parity RAM of each cache set, can present problems when using traditional parity generation techniques. However, by using predictive logic generation circuitry, the generation of the values of PI, P2, Px, Ps, for each data word in each cache set can be quickly and efficiently generated and placed in each of the appropriate Parity RAM units.

The parity bit P1 is the generated parity bit for the first byte in the data word, while P2 is the generated parity bit for the second byte of the data word. The Parity bit Ps is the generated parity bit for the two status bits V, R.

The Px bit is beyond the scope of this disclosure which is Primarily concerned with the generation of the parity bit, Ps, and their relation to the status bits V, R.

A programmable array logic unit 16 (Control PAL) will receive specified input signals which will then generate proper values for the V bit and the R bit for each word in each cache set of the multiple-set cache structure. Then, simultaneously, without any delay or waiting period, the prediction-generation logic in the Control PAL will generate the appropriate "parity bit" Ps(n) for the status bit field of V, R values. This generation logic acts to predict the parity value Ps for each data word according to the type of OP (operation) occurring i.e., to say when the OP is a Read-Miss, Read-Hit, Write-Miss, Write-Hit, etc.

DESCRIPTION OF PREFERRED EMBODIMENT

Figure 1:
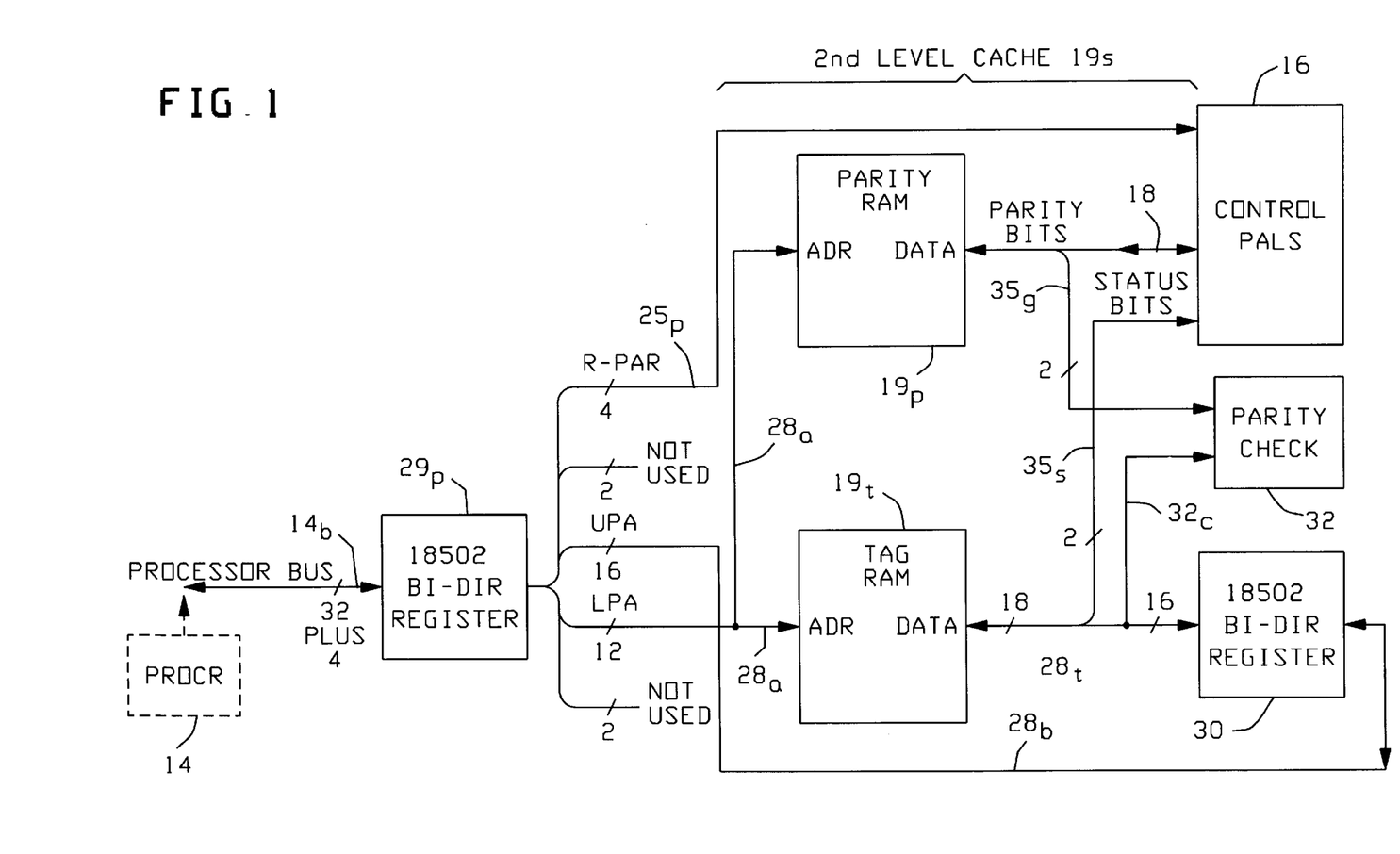
FIG. 1 is a drawing of the second level cache structure typical of the present system.

As seen in FIG. 1, there is an expanded view of the CPM module's RAM structure 19s which was indicated in FIG. 3B. The RAM structure 19s seen in FIG. 1 is for the second-level cache system 19s. However, this could also be applied to other types of RAM structures. As seen in FIG. 1, the central processor 14 connects via an internal processor bus 14b to the RAM structure 19s through a bi-directional register transceiver 29p. The bi-directional transceiver register chip 29p is used to isolate the processor bus 14b from the internal RAM structure busses 28a, 28b, and 25p. A typical bi-directional transceiver register chip such as 29p is a standardly manufactured item of the Texas Instruments Corporation of Dallas, Tex. and is designated as part 18502. The incoming bus from processor 14 to the RAM structure 19s is designated as bus 14b in the present example and is indicated as having 32 bits of address data for the cache RAM structure 19s. In addition to the 32-bits of address data on bus 14b, there are also 4 parallel bits of parity data so that the bus 14b carries a total of 36 bits of parallel data.

The information from the processor 14 via the processor bus 14b to the RAM structure 19s is internally divided into three separate portions. The lowest two bits are not used in the RAM structure because the particular RAM structure involved deals in blocks of four words only. Thus, as was seen in FIG. 3B, the RAM structure 19s was composed of four sets of RAM devices so that four words were held at each individually addressed location in each of the RAM structure 19s. While the lowest two bits on the processor bus 14b are not used in the RAM structure, the next lower 12 bits are transferred on a bus called the LPA bus 28a, FIG. 1, which carries the address pointer for addressing the Tag RAM 19t and the Parity RAM 19p (FIG. 1). The next 16 bits on the internal processor bus 14b are carried on the UPA bus 28b and this involves the data to be held and stored in the RAM structure 19t of FIG. 1. The upper 2 bits of the processor bus 14b holding the data field are not used but are always made into a zero value when the bus 14b is active.

The second level cache structure 19s of FIG. 1 is shown as having one RAM device called the Tag RAM 19t. However, the actual cache structure is made of four sets of such units as see in FIG. 1. The RAM device 19t (Tag RAM, FIG. 1) stores the 16-bit UPA (Upper Partial Address) values carried on bus 28*b*, through the bidirectional transceiver register 30 onto bus 28*t* for inserting address data into the Tag RAM 19*t*. The busses 28*b* and 28*t* also carry two status bits which are conveyed on bus 35*s* to the Control PAL 16. The second RAM device of the second level cache 19*s* seen in FIG. 1, is called the Parity RAM 19*p*. It stores four bits of parity carried on line 18 (from Control PAL 16) which is necessary to assure the integrity of the 18 bits of data value held in the same address location in the Tag RAM device 19*t*. The generation and the checking out of the 2 status bits, and the parity associated with them, is the major focus of the present system.

The UPA (Upper Partial Address) bus 28*b* passes through another transceiver register 30 to carry the address data on bus 28*t* to be written into the RAM devices 19*t* as address data. This transceiver 30 is present to allow the values read from the Tag RAM 19*t* to also become a source back onto the UPA bus 28*b* at those times when the Tag RAM 19*t* is being read-out to pass data back to the processor 14. Also seen in FIG. 1, is the Parity check logic 32 which checks the parity on the 16 bits of address data which is read-out from the Tag RAM 19*t*. The UPA bus 28*b* and the stored 16-bits of data in the Tag RAM 19*t* and its associated parity, is not the focus of the present system.

The two status bits on bus 35*s* in the Tag RAM device are created from the Control PAL 16. The criteria for these two status bits is the major subject of the present system. The Control PAL 16, FIG. 3B creates the two status bits and also their parity value to be written into the Tag RAM 19*t*, and the Control PAL 16 monitors and checks the status bits and their parity when the Tag RAM is read-out so that the Tag RAM data values can be passed onto the processor 14.

Figure 2B:
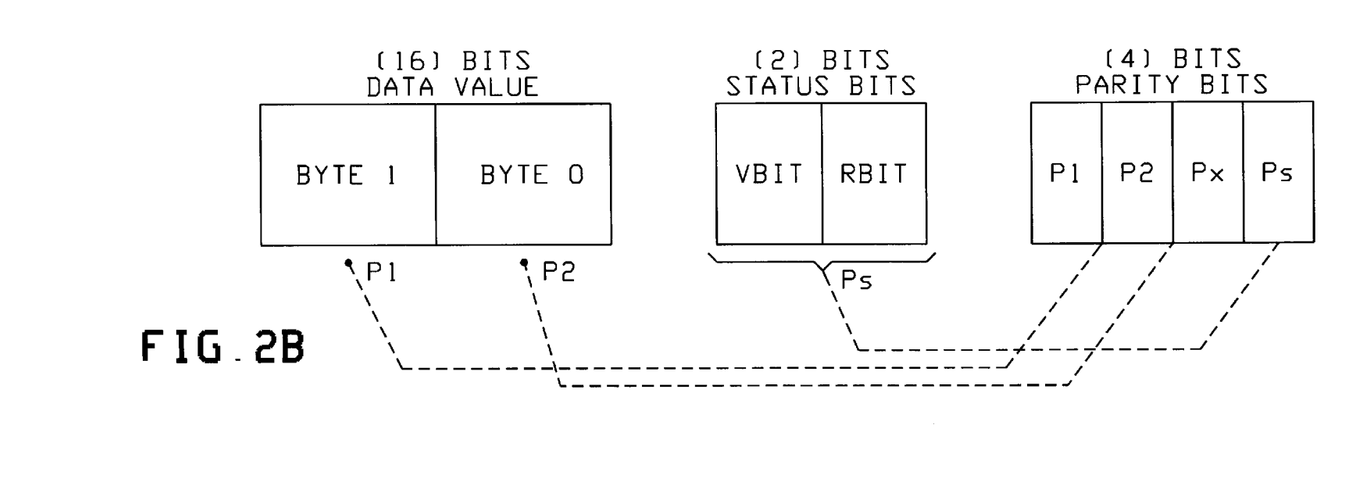
FIG. 2B is a more detailed drawing of a located word which shows a 16-bit data value, a 2-bit portion for status bits and a 4-bit portion for parity bits for a total of 22 bits stored for a given word.

Status Bits (V,R):

As seen in FIG. 2B, the RAM Structure 19*s* shows that for each word there are 16 bits (2 bytes) of stored "data" information. What the data specifically involves is not pertinent in this situation. However, the data could well be any number of bits wide and have many varieties of specific meaning. In this particular embodiment, since the RAM structure is the Tag RAM 19*t* of a cache module, the two bytes of "data" are actually the stored address index for the cache module. Also seen in FIG. 2B, are three bits of parity associated with the 16-bit data values and these are indicated as the parity bits P1, P2 and Px. Further, the FIG. 2B shows two important "status" bits. These are designated "V" and "R". The "V" status bit indicates whether the "data" bytes in the second level cache 19*s*, are current, that is to say, "valid". The second status bit "R Bit" is the Reflection bit which indicates further information about the address index data stored in the Tag RAM 19*t* at this particular location. The Reflection bit "R" reflects whether the processor's internal first level cache (19*f*, FIG. 3B) also has a valid "copy" of the current address value residing in the second level Tag RAM 19*t*. If "R" =1, then the address data in that location of Tag RAM 19*t* is a copy of the "valid" status of the internal first level cache 19*f* of the processor 14. Further, associated with the two status bits V and R, is a single parity bit called "Ps". This parity bit is the parity bit which represents the two status bits'(V, R) parity. The generation and checking of these three bits, that is to say, the two status bits and the parity bit Ps by the Control PAL 16 is the major subject of the present system.

Generation of Status Bits (V Bit, R Bit):

Whenever new information is written into the RAM structure 19*s*, the status bits V, R, must be created. When the RAM structure 19*s* is written-to by the insertion of a word, then three internal items are written therein as seen in FIGS. 2A and 2B. The three items written include (i) the data value, derived from the address; (ii) the two status bits V and R; and, (iii) the four parity bits which are associated with the data value and with the status bits. The two status bits V and R, where each 16-bit data value is shown in FIG. 2B, also indicates the four parity bits involved where the parity bit P1 is the parity for byte 1, the parity bit P2 is the parity bit for byte 0, the parity bit Ps is the parity bit for the status bits, plus there is generated one extra parity bit Px to be described hereinafter. In the presently described system, the major focus has to do with the generation of the status bits V, R and their associated parity bit Ps.

As was indicated in connection with FIG. 1, the two status bits V, R, on bus 35*s* are created by the programmable array logic, Control PAL 16. These V, R bits are stored as two bits in the Tag RAM module 19*t* when data is read back from the Tag RAM 19*t* by the processor 14. The Control PAL 16 again will monitor the status bits and take any appropriate action. FIG. 1 also indicates that the Tag RAM 19*t* and the Parity RAM 19*p* provides a width of 22 bits, that is to say, the 16 bits of data, the two bits of status bits, and the four bits of parity bits. This is the situation for each single set of the cache RAM structure which is composed of the four sets shown in FIG. 3B.

As was seen in FIG. 3B, the second-level cache structure 19*s* was composed of four RAM sets to provide a four-way or four-set RAM structure 19*s*. Thus, there are four identical 22-bit wide Tag and Parity RAM groupings. That is to say, each Tag RAM 19*t* has its own Parity RAM 19*p* and this is a characteristic of each of the four Tag RAMs 19*s*. Thus, the structure 19*s* of FIG. 3B would have Tag RAMs and four Parity RAMs 19*p*. The four identical structures operate in parallel. Each one is addressed identically by the LPA (Lower Partial Address) bus 28*a* of FIG. 1. Each one of the four RAMs receives a copy of the information on the UPA bus 28*b* via the individual isolation transceiver-register 30. Now, when the cache RAM structure 19*s* is read (that is to say, on checking-out for a cache "hit" condition), all four of the identical cache RAM sets are simultaneously read. Thus, the Control PAL 16 actually must check and monitor four sets of the two status bits V, R, which constitutes a total of 8 bits, that is to say, four V bits and four R bits. The same is true for the four parity bits P1, P2, Px, and Ps. Thus, there are actually four sets of the four parity bits, resulting that the Control PAL 16 must monitor and check a total of 16 parity bits, that is to say, four times the group P1, P2, Px, Ps.

On the other hand, whenever the RAM structure 19*s* is to be written-into and loaded with the address index data values, the status bits of the parity bits, in this case, only a single set of the four identical RAM structures will be "enabled" to be written into. The Control PAL 16 must create all four sets worth (16 bit values) of status bits (they are all identical values), but then only one RAM set will actually be written into. The Control PAL 16 must also create four sets worth of parity bits (again, all identical values for the set) but only 1 set will be written into a particular RAM structure.

The fact that a multiple-way (four set) cache structure is used, will cause logistical problems for the Control PAL 16. Since there are four times the number of signals required, this increases the number of Control PAL pins and Control PAL logic required. However, the system and method of the present circuitry helps to "minimize" this growth problem which is presented to the Control PAL 16.

Figure 4A:
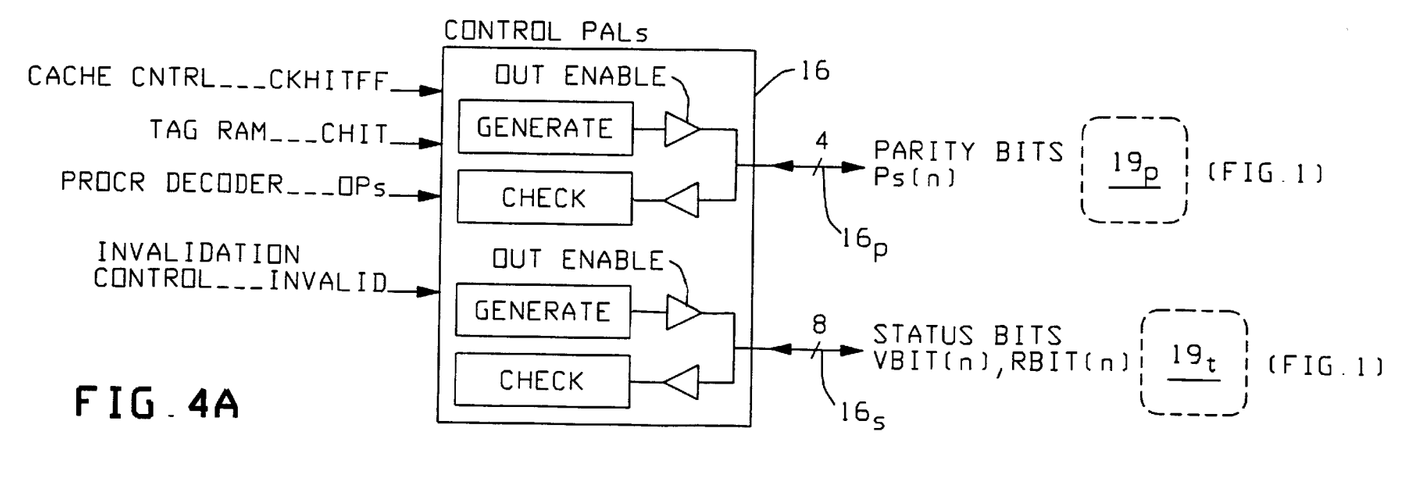
FIG. 4A is a schematic drawing of the programmable array logic, Control PAL, showing the input signals and output signals involved.

FIG. 4A is a drawing showing a portion of the Control PAL 16. The entire Control PAL 16 may be made of several such blocks as shown in FIG. 4A, so that there are multiple output lines to generate the parity bits Ps(n) where n=0, 1, 2, 3 and also the status bits for the V bit(n) and the R bit(n). FIG. 4A shows the output parity bits "Ps" having four output lines while the status bits V and R are seen to have 8 output lines. Thus, these service the four sets of RAM devices, 19s0, 19s1, 19s2, 19s3, of FIG. 3B. In FIG. 4A, there are seen four input signals to the Control PAL 16. The first signal CKHITFF indicates that, during this clock period, the Control PAL is to be "checking for hits" in the Tag RAM 19t. The CHIT is the cache "hit" signal which is detected when the Tag RAM 19t is read. The OPs input signal (for operator) is a field indicating the current processor bus operation which may be a Read, a Write or a LRUTAG(first level cache notifies second level cache as to where the current Read OP data will be written to and placed in the first level cache), whereby the first level cache 19f notifies the second level cache 19s of where the current Read OP data will be written-into in the first level cache. The INVLD input signal to the Control PAL 16 is the indication of an invalidation operation where the spy logic 22s (FIG. 3B) is presenting an address value from the system busses for an investigation of the cache RAM structure to determine if an invalid bit should be set. The input signals to the Control PAL 16 are indicated in the Table I shown below.

As was seen in FIG. 4A, the two major elements of the present disclosure which involve the parity bits Ps(n) and the status bits V bit(n), and the R bit(n) are seen as the outputs provided by the Control PAL 16 over to the four sets (19s0, 19s1, 19s2, 19s3) of the multi-way second level cache RAM structure 19s. (FIG. 3B). As seen in FIG. 4A, these four output signals for the parity bits and eight signals for the status bits are also bi-directional in nature. When the parity bits and the status bits are generated, they are seen as outputs of the Control PAL 16. However, when there is a monitoring and checking of the "parity bits" of the status bits, then these bits are then inputs to the Control PAL 16.

Thus, in summary of FIG. 4A, there are 8 total status bits which are really four sets of 2 status bits, that is to say, four sets of the V bit and four sets of the R bit. When checking the status bits, the four sets will probably be different, but when they are being generated, all four sets are created "identically" but only one set is actually written into the particular RAM device involved.

The Table II shown below, shows a number of various operations involved, and for each operation, there is shown the possible values of the status bits V and R "before" the operation cycle indicated, and the status of these bits "after" the operation cycle involved.

TABLE I

Input Signals to Control PAL 16 (FIG. 4A)

| | |
|---|---|
| CKHITFF | Timing control signal from another Control PAL indicating that "checking for hits" is to occur during this clock period. Only when CKHITFF is a true "hit", should the status bits and parity bits be investigated. When this signal is true, the Tag and Parity RAMs are being read. |
| CHIT | Cache Hit signal -- detected when Tag RAM is read, and at the addressed location, both of the following are true: (1) address index value stored in the RAM matches exactly the incoming UPA value, and (2) for the addressed RAM location the "Valid" status bit is on (=1). This signal is only meaningful when the CKHITFF signal is true. |
| OPS | Encoded field indicating the current processor bus operation. With regard to the RAM Structure and its status and parity bits, only the following operations are significant:<br>(1) READ -- (processor OP) read cache (if hit) or main memory (if miss) data.<br>(2) WRITE -- (processor OP) write data to main memory; update cache data (if hit).<br>(3) LRUTAG -- (processor OP) 1st-level cache notification to 2nd-level cache of "where" current read OP data will be written into 1st-level cache. |
| INVLD | Invalidation operation is active indicator. The spy or snooping logic is presenting an address value from the system busses for investigation of the cache RAM Structure. If a hit occurs, the location in the cache is invalidated -- valid status bit is turned off. If a miss occurs, then no further cache action is required. |

TABLE II

| STATUS BEFORE | | STATUS AFTER | | |
|---|---|---|---|---|
| V bit | R bit | V bit | R bit | OPERATION INVOLVED |
| x | x | 0 | 0 | Initialization of RAM structure. Before any normal operations. |
| 0 | 0 | 1 | 1 | READ - MISS Operation: The 1st-Level Cache (R bit = 0) does not have the Read value; the 2nd-Level Cache (V bit = 0) does not have the Read value. After the Read data is returned from main memory, it will be put into both cache levels (V bit => 1) and R bit => 1). |
| 1 | 0 | 1 | 1 | READ - HIT Operation: The 1st-Level Cache (R bit = 0) does not have the Read value; but the 2nd-Level Cache (V bit = 1) does have the Read value. After the 2nd-Level Cache data is returned to processor, it will be in both cache levels (R bit => 1). |
| 0 | 0 | 0 | 0 | WRITE - MISS Operation: Neither cache level has the adress value, therefore neither level will be updated with the Write data. No change to cache or status bits. |
| 1 | 0 | 1 | 0 | WRITE - HIT Opertion: 1st-Level Cache (R bit = 0) does not have the Write value; but 2nd-Level Cache (V bit = 1) does not have the Write address value Therefore, the 2nd-Level Cache will be updated with the Write operation new data value. N change to status bits. |
| 1 | 1 | 1 | 1 | WRITE - HIT Operation: 1st-Level Cache (R bit = 1) does have the Write value; and 2nd-Level Cache (V bit = 1) does have the Write value. Therefore, the 2nd-Level Cache will be updated with the Write operation new data value. No change to status bits. |
| 1 | 1 | 1 | 0 | LRUTAG Operation: 1st-Level Cache (R bit = 1) is overfilling a currently valid location. The 2nd-Level Cache marks (R bit = > 0) the location as no longer valid in 1st-Level cache. |
| 0 | 0 | 0 | 0 | INVALIDATION - MISS Operation: Neither cache level contains the invalidaton operation addrss value. Therefore, no further cache actions are taken. No change to status bits. |
| 1 | 0 | 0 | 0 | INVALIDATION - HIT Operation: 1st-Level Cache (R bit = 0) does not have the address value; but the 2nd-Level Cache (V bit = 1) does have the address value. Therefore, the 2nd-Level Cache will mark its location as no longer valid - invalidation (V bit => 0). |
| 1 | 1 | 0 | 0 | INVALIDATION - HIT Operation: 1st-Level Cache (R bit = 1) does have the adress value; and the 2nd-Level Cache (V bit = 1) does have the address value. Therfore, both Cache levels will mark the location as no longer valid - invalidation (V bit => 0) and (R bit => 0). |

It will be seen from Table II that the only situation where there is no change to the V and R status bits will occur during the WRITE-HIT and WRITE-MISS operation and also on the INVALIDATION-MISS operation. All of the other types of operations involved will be seen to result in a status change in the V bit or the R bit before the operation, to that status difference after the operation.

Figure 4B:
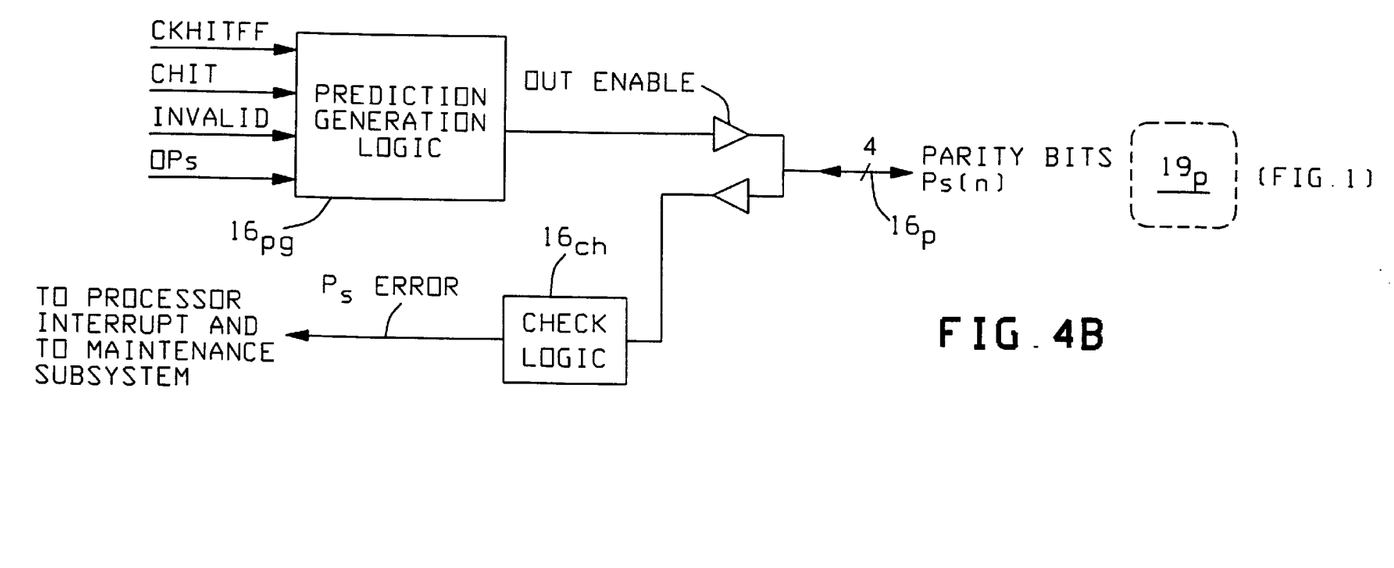
FIG. 4B is a drawing showing the prediction generation logic and check logic of the programmable array logic of FIG. 4A.

FIG. 4B is a diagram of the prediction generation logic 16pg of the Control PAL 16 whereby the parity bits Ps(n) are generated outward to the four Parity RAMs 19p (19p0, 19p1, 19p2, 19p3) to hold the parity values for the correspondingly addressed address value locations in the Tag RAM 19t. The parity bit output lines, of which there are four output lines of FIG. 4B are also bi-directional and enable the parity bits in each of the Parity RAMs 19p to be read back to the Control PAL 16 such that the check logic 16ch can validate the parity values.

The generation of the 8 status bits, that is to say, 4 V bits and 4 R bits shown in FIG. 4A, are then provided with the four parity bits Ps(m) by the logic shown in FIG. 4B, and as was indicated in FIG. 2B. Table III shown below shows the equations involved in the Control PAL 16's generation of the status bits V, R as based on the various types of operations involved in Table II.

TABLE III

Generation of V bit and R bit

| | | |
|---|---|---|
| V bit = 1 | INVLD/ | Invalid operation is not active. |
| | + (LRUTAG_OP) | LRUTAG operation is active. |
| R bit = 1 | (READ_OP) * (LRUTAG_OP)/ | READ operation is active and LRUTAG operation is not active. |

Notes:
+ = OR
* = AND
/ = NOT

FIG. 4A shows that the 8-bit status bit output bus 16s and the four bit parity bit output bus 16p are bi-directional in operation, thus an output enable signal must be provided to control this as to when the Control PAL 16 will output the generated status and parity values. Table IV shown below indicates the generation of the "output enable" for the status bits (8 status bits). The Table IV also defines several other control terms involved in the logic, especially the WRITESTA, which is the "Write Status Control Timing" term.

TABLE IV

| Output_Enable = 1 | WRITESTA | Write status control timing term. |
|---|---|---|
| WRITESTA = 1 | (WRITE_OP)/ * CHIT<br>+ (READ_OP) * (LRUTAG_OP)/ * CHIT/<br>+ HITMISSF | Any non-WRITE operation and Hit signal. READ but not LRUTAG operation and not a Hit. Timing flip-flop to extend status bit write time. |
| HITMISSF<br><= 1 | (WRITE_OP)/ * CHIT<br>+ (READ_OP) * (LRUTAG_OP)/ * CHIT/<br>+ INVLD * CHIT | Any non-WRITE operation and Hit signal. READ but not LRUTAG operation and not a Hit. Invalidation operation with a Hit. |

Notes:
+ = OR
* = AND
/ = NOT

In regard to the Tables III and IV, it will be seen that the rather complex status bit handling situations are implemented with a few simple equations using only a few signals in the Control PAL 16. This constitutes a large savings factor in both the number of input pins required for the Control PAL 16 and also savings in the need for available logic within the Control PAL 16.

Checking of Status Bits:

As was seen FIG. 4A, the two status bits V and R constitute a total of 8, that is to say, there were two status bits V and R for each one of the four sets of RAM devices. These were seen as bi-directional as far as the Control PAL 16 is concerned in FIG. 4A. The output of the Control PAL 16 for the generation of the status bits V and R, was described in the previous section. In FIG. 4A, the bi-directional bus 16p is indicated for carrying the parity bits to each one of the four RAM devices in the cache structure 19s. Likewise, the bus 16s is designated as an 8-bit bus to carry the status bits V and R to each one of the four sets of cache RAM devices. These busses can also operate as inputs to the Control PAL 16 when the Control PAL is operated to check the parity bits and the status bits.

The major function of the valid status bit "V bit" is for Hit or Miss detection. This checking is actually done within the Tag RAM module 19t.

Other checking operations of the status bits is done by the Control PAL 16. One of such checking functions is that called the "Smart Fill" algorithm. Here, for a "Read-Miss" condition, the logic attempts to pick (based upon the V bit and the R bit) which is the best set of the four cache devices into which to fill the next "Write" data. This was the subject of another co-pending patent application, U.S. Ser. No. 592,092 entitled "Smart Fill Allowing Full Efficiency of Multi-Way Cache and System".

Another function of the Control PAL 16 is the checking of the status bits V, R, in assisting of reduction in processor bus 14b traffic during invalidation cycles. Here the R bit is used to determine if an invalidation address must be transferred to the first level cache 19f over the processor bus 14b. This configuration is the subject of another co-pending patent application U.S. Ser. No. 592,093 entitled "Processor Bus Traffic Optimization system for Multi-Level Cache Utilizing Reflection Status Bit".

The present system for use of the status bits V and R is for the prediction checking of the parity bit on the "status" bits V and R (2 bits). This usage and development is discussed hereinafter in this system.

Parity Bit:

FIG. 2B indicates that for the status bits portion of the word structure, there is a parity bit designated Ps which is associated with the status bits. In actuality, there are four of the parity bits "Ps", one for each of the four cache sets (0, 1, 2, 3). The logic for each of these is identical. From Table II, it was seen that the two status bits for each set (V bit and R bit) can take on a number of possible combinations, depending upon the operational situation involved. Thus, the associated parity bit, Ps, of FIG. 2B, must therefore "change" depending upon each of the same set of operational situations seen in Table II.

Generation of Parity Bit:

The parity for the two bits V, R, can be generated quite easily by simply monitoring the two bits and counting the number of "1's" in the two bits, and then making the parity bit of such a value as to make the total number of "1's" for the three bits (two status bits, plus one parity bit), equal to an odd number for the odd parity method. The counting of the "1's" is really an equation such as P=1 1 +0 0. This indicates that the parity bit (V,R) should be of a value of "1" when the status bits are both the same, that is to say, both "1's" or both "0's". However, as simple as this method seems, it involves a problem in some applications for the following reasons indicated under paragraphs A and B shown below.

(A) The two status bits V and R must exist and be stable "before" the logic to generate the correct parity bit can start its counting (that is to say, the AND and the OR above) in order to make the correct parity bit. This may involve a serious timing problem in some applications.

(B) Since there are actually 8 status bits to be counted (4 V bits and 4 R bits) and also four parity bits to be generated (P1, P2, Px, Ps) for each one of the four cache sets, this can involve an inordinate amount of pins for some chip devices that may already have nearly full usage of the pins. Besides these 12 signals (8 status bits and 4 parity bits), the several signals of Table I seen before, are also necessary for the proper functional control and timing.

The method and system presented herein does not generate the parity bits for the status bits by monitoring all of the status bits and counting the "1's" for both of the above reasons (A) and (B). To be able to write the proper parity bit Ps(n) into the Parity RAM 19*p* at the appropriate time, the timing will not allow waiting until the status is stable before beginning to count "1's". Also, the PAL device 16 used to generate the parity bit(s) does not have access to all of the status bits, V, R. Therefore, a method of generation by prediction is implemented in the present system here. Here, simple logic is used to predict what the parity "should be" based upon the operational situation.

The Table V below, summarizes all the operational situations derived from Table II, and then adds the status parity bit "before and after" the operation involved. The "parity change" column of the Table V gives the information as to the method of generation of the parity by prediction rather than the more complex necessity of counting the "1's".

time (no need to wait for status bits to stabilize) and the Control PAL 16 connections. The prediction generation logic 16*pg* monitors the control terms of Table I.

Now referring to Table V, the following is an indication of the conditions and predictions for the parity bit Ps of FIG. 4B.

(i) RAM initialization: The parity bit will always be written to a "1" value (=1). However, the initialization of the RAM devices is done by the maintenance subsystem via a JTAG path and is not done by the normal parity logic presented herein.

(ii) READ Operations: All READs whether misses or hits, will produce the same status bit parity value (=1). Simply, for READs there is always a generation of Ps=1.

(iii) WRITE Operations: For Writes whether misses or hits, the Tag RAM 19*t* and the Parity RAM 19*p* are never written into but only read out from. Therefore, the parity bit previously placed in the Parity RAM 19*p* is unchanged.

(iv) LRUTAG Operations: This operation always Writes to the status bits V, R and their parity bit Ps. The parity bit (Ps) is always written to a zero value (Ps=0).

(v) INVALIDATION Operations: Invalidation misses do not change the Tag RAM 19*t* or the Parity RAM 19*p*,

TABLE V

| STATUS & PARITY BEFORE | | | STATUS & PARITY AFTER | | | PARITY CHANGE | OPERATIONAL |
|---|---|---|---|---|---|---|---|
| Ps | V | R | Ps | V | R | nc: no change | DESCRIPTION |
| x | x | x | 1 | 0 | 0 | => 1 | Initialization of RAM structure. Before any normal operations. |
| 1 | 0 | 0 | 1 | 1 | 1 | => 1 | READ-MISS Operation -- miss in both cache levels. |
| 0 | 1 | 0 | 1 | 1 | 1 | => 1 | READ-HIT Operation -- hit in 2nd-Level cache. |
| 1 | 0 | 0 | 1 | 0 | 0 | nc | WRITE-MISS Operation -- miss in both cache levels. |
| 0 | 1 | 0 | 0 | 1 | 0 | nc | WRITE-HIT Operation -- hit in 2nd-Level cache only. |
| 1 | 1 | 1 | 1 | 1 | 1 | nc | WRITE-HIT Operation -- hit in 1st-Level & 2nd Level caches. |
| 1 | 1 | 1 | 0 | 1 | 0 | => 0 | LRUTAG Operation -- 1st-Level cache is overfilling a valid location in both caches. |
| 1 | 0 | 0 | 1 | 0 | 0 | nc | INVALIDATION - MISS Operation -- neither cache level currently contain the spy (snoop) address value. |
| 0 | 1 | 0 | 1 | 0 | 0 | => 1 | INVALIDATION - HIT Operation -- only 2nd level cache currently contains the spy address value and is invalidated. |
| 1 | 1 | 1 | 1 | 0 | 0 | => 1 | INVALIDATION - HIT Operation- both cache levels currently contain the spy address value; both are invalidated. |

From Table V, it is seen that the generation of the Ps parity bit values can be done without looking at the actual "before or after" status bit values for V and R. Just as with generation of the status bits V, R, then, by using the control signals of Table I as the timing and operation specifies, the parity value Ps can be written into the Parity RAM 19*p* and can be predicted.

FIG. 4B expands upon the parity bit Control PAL logic 16 of FIG. 1. The prediction generation logic 16*pg* for the parity bit Ps (of the status bits V, R) does not need any knowledge of the actual status bits V, R. This provides a savings of both therefore the parity bit for "misses" is unchanged. For Invalidation Hits, the parity value is always written to a "1" value (Ps=1).

The above five operational situations (i)–(v) described above, indicate that it is advantageous to "predict" the parity bit (Ps) rather than count the "1's" involved in the status bits V, R. Table VI, shown below, provides the use of simple equations in the Control PAL 16 for deriving the status parity bit (Ps). It may be noted that the output-enable logic is identical to that for the status bits in Table IV.

TABLE VI

| Output_Enable = 1 | WRITESTA | Write status control timing term (see Table IV). |
|---|---|---|
| PARITY BIT Ps = 1 | (READ_OP) * (LRUTAG-OP)/ + INVLD * CHIT | READ but not LRUTAG operation. Invalidation operation with a Hit. |

Notes:
+ = OR
* = AND
/ = NOT

Table VI shows that the parity generation by prediction logic is a simple matter even though many operational situations must be considered. It may be noticed that here, the parity bit (Ps) can be generated at the same exact time that the corresponding status bits V, R, are being generated (seen in Table IV). There is no need or requirement to count "1's" after the status bits V, R, have been made and have stabilized. However, the value of the Ps parity bits can be simplified even further as is indicated in Table VII, shown below.

TABLE VII

| PARITY BIT Ps = 1 | (LRUTAG_OP)/ | Not LRUTAG operation. Parity bit is written to a one value except when LRUTAG operation occurs. |
|---|---|---| to determine whether there is a cache "hit" or a cache "miss", then "bad" status bits could cause bad data to be returned to the processor 14 on a fictitious or false hit.

However, unlike parity generation where fast timing is very important, the situation is different when checking parity in that the timing is not a central concern. All of the RAM bits are read together as a single word. Therefore, both the status bits and the parity bits are immediately available to the check logic 16ch of FIG. 4B. Also if necessary, parity detection can occur a clock period later, since, if an error is detected, an interrupt type of action must be taken anyway.

Table VIII shown below gives the operating equation for the status parity error detection signal of FIG. 4B.

TABLE VIII

| PS_ERROR_n (n = 0,1,2,3) (one per set) | Psn/ * (Vn/ * Rn/ + Vn * Rn) + Psn * (Vn/ *Rn + Vn/* Rn) | Wrong number of one bits detects an error. |
|---|---|---|

Notes:
+ = OR
* = AND
/ = NOT

Figure 5:
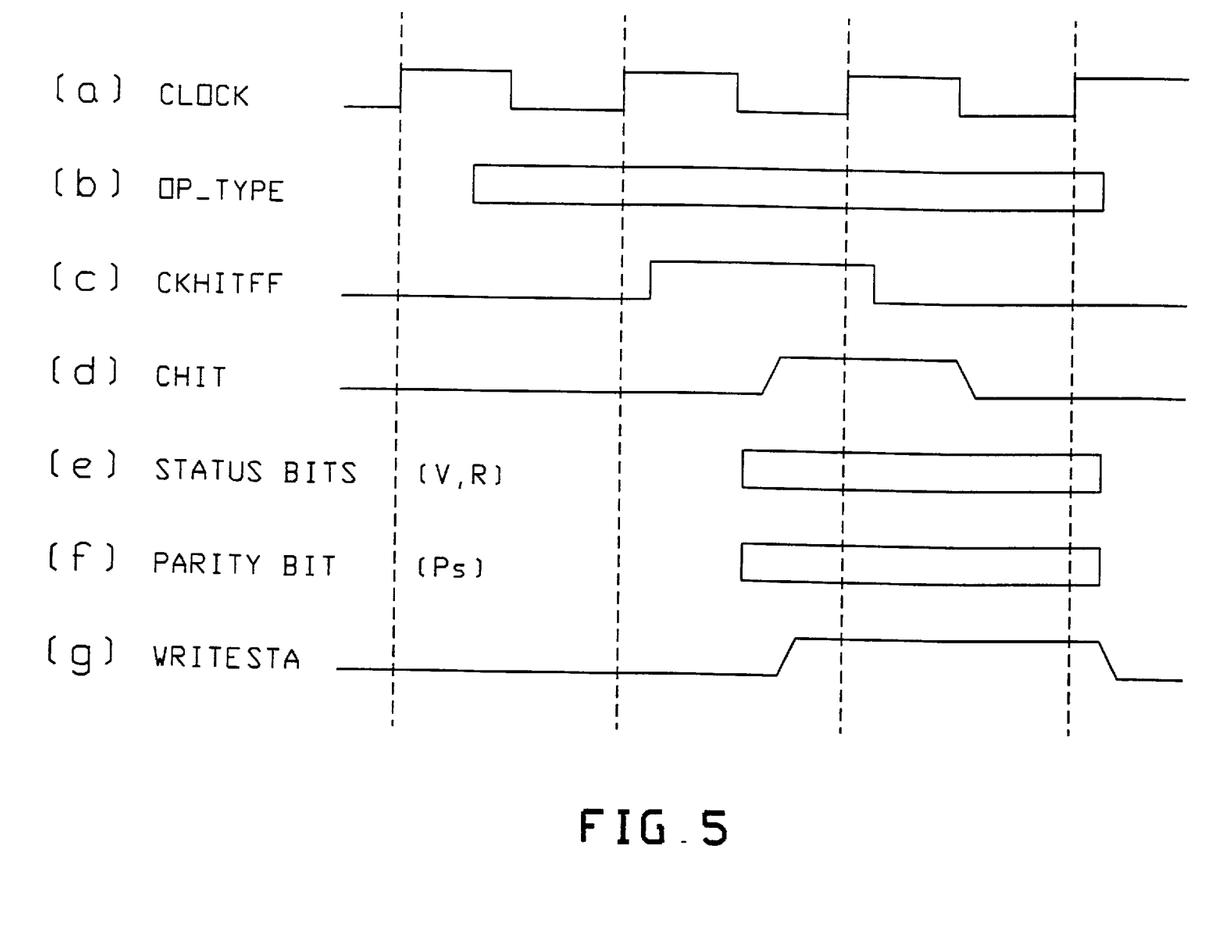
FIG. 5 is a timing diagram showing the basic timing required of the prediction generation circuitry and the RAM writing operation.

Referring to FIG. 5, there is seen a timing diagram which is indicative of the prediction generation process and the RAM writing process. This indicates the importance of the prediction method, rather than the method of waiting and the counting of "1's" as a method for generating the status bits and the parity bits.

Line (a) of FIG. 5 is the clock signal. Line (b) shows the type of operation involved, such as was indicated in Table II. Line (c) shows the activation of the timing control for "checking for hits". Line (d) shows the activation of the cache "hit" signal and the subsequent generation on line (e) of the status bits V, R and on line (f) of the parity bit Ps during the activation on line (g) of the WRITESTA signal. It is seen that the parity bit Ps is generated at the same time as the status bit V,R, are generated. The WRITESTA signal is shown in Table IV as the "Write Status Control" timing term.

Checking of the Parity Bit (Ps):

The checking of each of the parity bits Ps (Ps0, Ps1, Ps2, Ps3) associated with the two status bits V, R, for each of the four sets of RAM devices, is an important factor in the present system. Proper parity, when the status bits V, R, are read, gives confidence in the system that the status bits, that are read, are "correct". Since the status bits are used, in part, In summary, the presently described system and method provides the capability to generate the parity bit, Ps for the status bits V, R, held in a RAM structure by predicting their value based on the operational situation, rather than by counting the number of 1 bits involved in the each set of the 2 status bit sets of V's, R's. The advantage to this method is that the parity bit (Ps) (for each of the sets of status bits) can be generated simultaneously with the generation of the status bits V, R, rather than having to wait for the status bits to stabilize before enabling parity generation of the parity bit (Ps). The method used herein can be totally implemented using only a small portion of a Flex PAL programmable array logic device such as manufactured by the Intel Corporation of Santa Clara, Calif.

While a particular implementation of the above methods of generating the parity bit for the status bits of a word in a RAM has been described, it should also be understood that the invention may have other similar implementations, but yet which are defined by the following claims.

What is claimed is:

1. In a computer network having a multi-set cache structure which includes a small first level cache and a large second level cache supporting a central processor, said second level cache providing a set of Tag RAMs holding address words of two bytes each with two status bits V,R, while also providing a set of corresponding parity RAMs for storing a parity bit (P1, P2) for each byte of each address words and a parity bit Ps for each set of status bits V,R, a predictive logic generation system for generating, during each processor operation (OP), the proper status bits V,R and the proper parity bit (Ps) for each pair of status bits V,R for each address word in said cache structure comprising:

(a) said second level cache including multiple sets of RAMs where each set has a Tag RAM holding said address words and a Parity RAM for holding a parity value P1, P2 for each of said two address word bytes and a parity value Ps for said two status bits V,R;

(b) means to sense the value of each of said two status bits V,R and the type of OP cycle being executed in order to simultaneously generate, concurrently with the processor operation, the exactly proper status bits V,R, and the parity bit Ps values for each address word in each set of Tag RAMs;

(c) means to place said exactly proper status bits V, R and parity values, Ps into the correspondingly addressed location in each set of said Tag and Parity RAMs.

2. The system of claim 1 wherein said two status bits V,R in each address word include:

(i) a valid bit V which indicates the validity/invalidity of each address word in each Tag RAM set of said second level cache;

(ii) a Reflection bit R which indicates whether said first level cache holds a copy of an address word residing in said second level cache.

3. The system of claim 1 wherein said means to sense includes:

(a) programmable array logic means connected to each cache set of said multi-set cache structure, including:
   (a1) means to read out the value of each one of said two status bits V,R in each said address word in said Tag RAM;
   (a2) means to sense the type of OP being executed by said central processor;
   (a3) means to reset the two status bits V,R for each address word in said Tag RAM during execution of the processor OP;
   (a4) means to predict the proper parity value for said two status bits V,R of each addressed word according to the type of processor OP involved, including:
      (a4a) means to generate and place, in said Parity RAM, the proper parity bit value Ps for said status bits (V,R);
      (a4b) means to generate and place in said Tag RAM, the proper status bits V,R for each address word involved in a processor OP.

4. In a computer network with central processor having a multi-set cache structure which includes a small first level cache holding a data word of two bytes plus a validity bit, V, and a large second level cache providing a set of Tag RAMs and associated Parity RAMs which also support said central processor, wherein each Tag RAM location in said second level cache holds an address data word of two bytes with two status bits (V,R) and wherein said second level cache also provides a separate parity RAM for each Tag RAM for holding the parity values (P1,P2) associated with each address word and a parity bit, Ps, for each set of the two status bits, (V,R), each said Tag RAM and parity RAM connected to a predictive logic means which predicts, creates and controls parity operations, a method for predictively generating the two status bits (V,R) and the proper parity bit Ps for each set of the two status bits occurring in each address data word of said cache RAM structure which is involved in a processor OP, said method comprising the steps of:

(a) receiving, by said predictive logic means, a signal indicating the current processor bus operation (OP);

(b) receiving, by said predictive logic means, a signal indicating that it is to be checking for "hits" in the Tag RAM;

(c) receiving, by said predictive logic means, of a "hit" signal indicating that a requested address has been located in the Tag RAM;

(d) receiving, by said predictive logic means, of an invalid signal indicating the occurrence of an invalidation operation to determine if the valid bit, V, should be turned off at a given address;

(e) sensing the values of the said two status bits V,R, before the processor OP completion;

(f) generating a new set of predicted status bits (V,R) simultaneously during a processor OP and simultaneously generating a new parity bit (Ps) for the status bits (V,R).

5. In a computer network having a central processor connected via a datapath array to dual system busses supporting a main memory module and I/O module, said network having a multi-set cache structure which includes a small first level cache holding an address data word of two bytes plus a validity bit, V, and a large second level cache including a set of Tag RAMs and a set of Parity RAMs also supporting said central processor, wherein each Tag RAM location in said second level cache set holds an address data word of two bytes with two status bits V,R, where V represents the validity of the data and R indicates that the first level cache has duplicate address information to the second level cache location, a system for obviating the need to calculate parity values and status bit values during processor operations comprising:

(a) said multi-set cache structure including n sets of first level cache units and n sets of second level cache units wherein each of said second level cache units includes a Tag RAM for holding address data words of two bytes with two status bits V,R for each address data word and includes a parity RAM for holding parity bits P1, P2, associated with each byte of said address data word and a parity bit Ps for each set of status bits (V,R);

(b) means to connect said central processor to each of said Tag RAMs and parity RAMs;

(c) predictive logic means connected to each of said Tag RAMs and parity RAMs, said predictive logic means including:
   (c1) means to sense the processor OP initiated by said central processor;
   (c2) means to create the status bits V,R for each address word in said Tag RAM, simultaneously and by prediction from the type of processor OP occurring;
   (c3) means, simultaneously with the processor OP, to create the predicted proper parity bit Ps for each set of status bits (V,R);

(d) parity check means for checking the parity of each address data word which is read out from said Tag RAM;

(e) said data path array means connecting said dual system busses from a main memory module and I/O module to said central processor, and to said predictive logic means and to said n sets of second level cache units;

(e) spy logic means connected to said dual system busses for transmitting address data word signals to said second level cache for invalidation operations if a hit should occur.

6. The system of claim 5 wherein said predictive logic means includes:

(a) a programmable logic array programmed to simultaneously generate the necessary status bits V,R, and parity bit, Ps, for each type of processor OP occurring for each prior status condition of an address data word operated on by said processor OP.

7. The system of claim 5 wherein said predictive logic means includes:

(i) means to write the generated status bits V,R, into the location of the addressed data word;

(ii) means to write the generated parity bit, Ps,.to the Parity RAM location corresponding to the addressed data word.

* * * * *